May 11, 1926.

R. W. NILES

BATTERY CHARGING DEVICE

Filed Sept. 22, 1922 2 Sheets-Sheet 1

Inventor
RAY W. NILES
By Ming Harness
Attorney

May 11, 1926.

R. W. NILES 1,583,792

BATTERY CHARGING DEVICE

Filed Sept. 22, 1922

Inventor
RAY W. NILES
By King Harness
Attorney

Patented May 11, 1926.

1,583,792

UNITED STATES PATENT OFFICE.

RAY W. NILES, OF YPSILANTI, MICHIGAN.

BATTERY-CHARGING DEVICE.

Application filed September 22, 1922. Serial No. 589,900.

My invention relates to a device to be utilized for charging electric storage batteries and has for one of its objects, the provision of a simple and utilitous means of mounting the transformer usually found in such devices.

A further object is to provide a casing for the rectifier usually employed with such devices so as to enclose the same and thereby aid in muffling the noise created by the rectifier when in use and also to prevent dust and dirt from accumulating in the operating portions thereof.

A further object is to provide a novel mounting for the contact members of the rectifier so as to secure the greatest possible efficiency and at the same time dampen the noise of the same when it is in operation.

It is a further object of my invention to utilize the magnet of the rectifier as a portion of the housing therefor.

It is a still further object of my invention to provide a novel arrangement of the magnetizing coil with relation to the vibrating members.

With these and other objects in view, my invention consists in the arrangement, combination and construction of the various parts of my improved device as described in the specification, claimed in my claims and shown in the accompanying drawings, in which:

Figure 1:
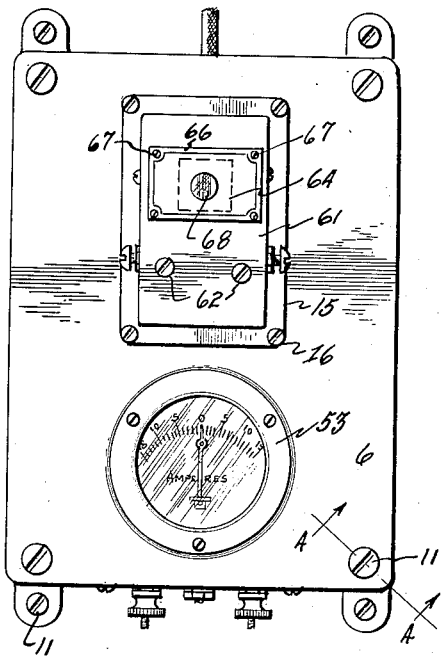
Fig. 1 is a plan view of my improved device with the cover of the rectifier placed thereon.
Figure 2:
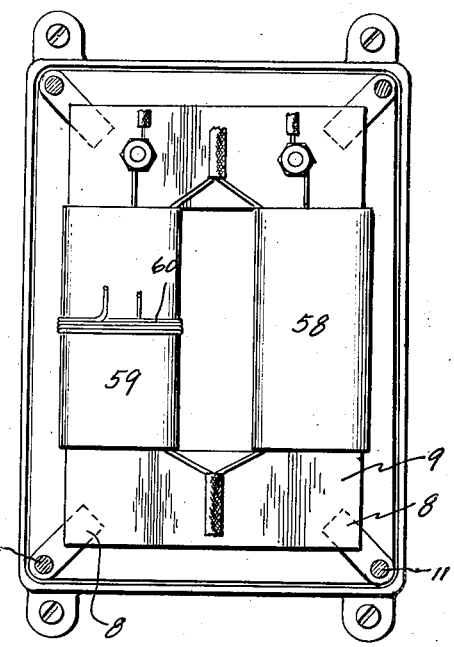
Fig. 2 is a similar view with the cover removed.
Figure 3:
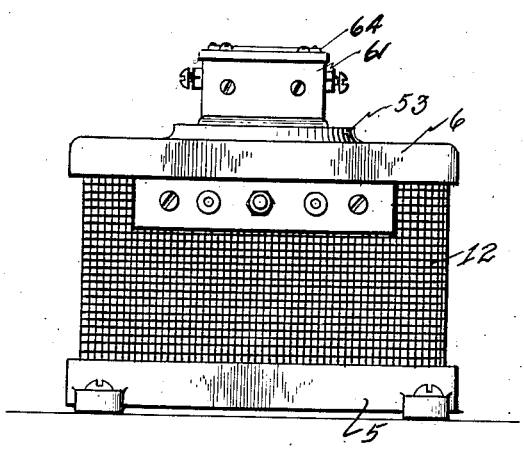
Fig. 3 is an end view of one end of my improved device.
Figure 4:
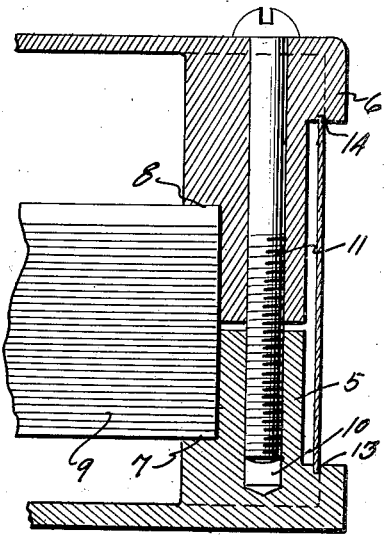
Fig. 4 is a detailed sectional view taken on line 4—4 of Fig. 1.
Figure 5:
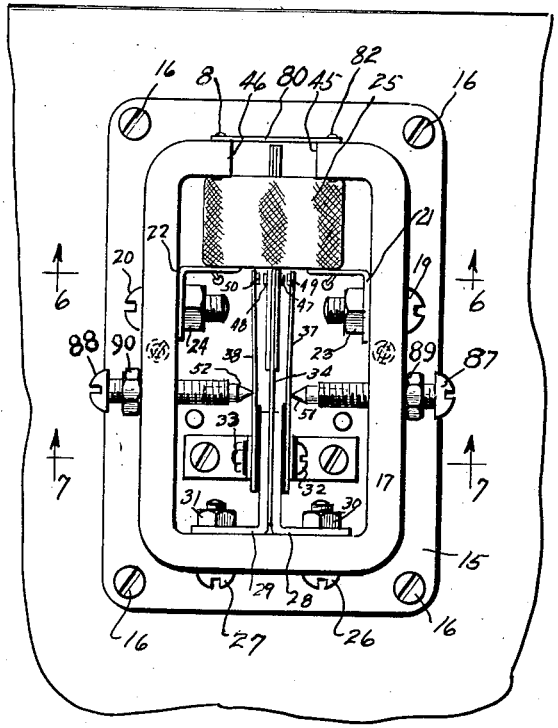
Fig. 5 is a plan view of the rectifier employed with my improved device.
Figure 6:
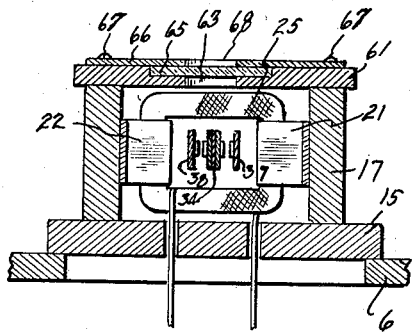
Fig. 6 is a sectional view taken on line 6—6 of Fig. 5.
Figure 7:
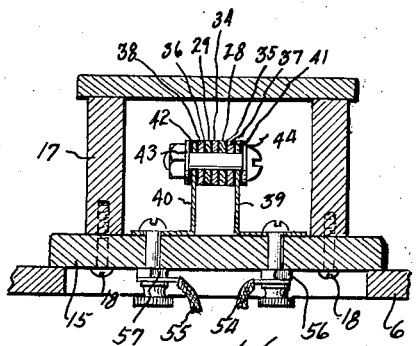
Fig. 7 is a sectional view taken on line 7—7 of Fig. 5.
Figure 8:
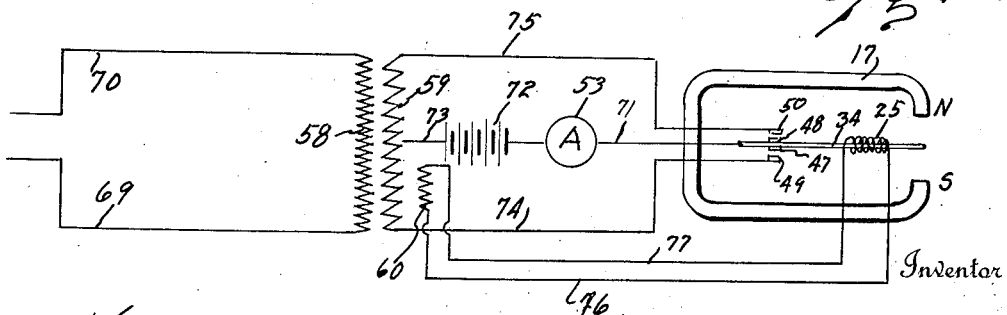
Fig. 8 is a diagrammatic view of the wiring mechanism employed in my improved device.

In the construction of my improved device, I provide a pair of housing members 5 and 6 within which a transformer is adapted to be disposed. The members 5 and 6 are provided with angular recesses 7 and 8 in each of the four corners thereof between which the plates 9 of the transformer are adapted to seat. The said members 5 and 6 are each provided with an aligned opening 10 in each of the four corners thereof through which screws 11 are adapted to be passed so as to securely hold the two members together with the connector plates 9 compressed therebetween in the recesses 7 and 8. In this manner the connector plates are securely fastened in place and rigidly held together.

A netting 12 is disposed around the sides of the housing members 5 and 6 in the slots 13 and 14 provided therein so as to protect the transformer elements contained therein.

The housing member 6 is provided with an aperture in the top thereof over which a nonconducting or nonmagnetic plate 15 is disposed and secured in place by series of screws 16 extending therethrough into the top of the member 6.

I provide a magnet 17 over the plate 15 and secured thereto by screws 18 extending through the plate 15 and into the magnet 17. The magnet is provided with free ends 45 and 46 which are secured against displacement relative to each other by means of a strap 80 secured to each end by screws 81 and 82.

Oppositely disposed to each other on the two sides of the magnet 17 are screws 19 and 20 over which are disposed on inner sides of the magnet, angle plates 21 and 22 adapted to be secured thereon by means of the nuts 23 and 24. The angle plates 21 and 22 are adapted to support and secure in place the coil 25.

On the closed end of the magnet are provided a pair of bolts 26 and 27 extending therethrough and having secured thereon angle plates 28 and 29 by means of the nuts 30 and 31 on the inner ends of the said bolts 26 and 27.

Secured between the angle plates 28 and 29 at their outer ends by means of the bolt 32 and nut 33 is a vibrating reed 34 and on either side of the said plates secured by the same means are insulating strips 35 and 36, reeds 37 and 38, angle plate conductors 39 and 40, insulating strips 41 and 42 and washers 43 and 44.

The reed 34 extends longitudinally of the magnet 17 through the coil 25 and between the ends or poles 45 and 46 of the magnet and has on either side thereof, intermediate its ends, contact points 47 and 48 adapted to contact with the points 49 and 50 on the reeds 37 and 38.

Projecting through the sides of the combination housing and magnet 17 are screws 87 and 88 having nuts 89 and 90 thereon and being provided at their inner ends with nonconducting tips 51 and 52 adapted when the screws are moved inwardly and outwardly to act as adjustments for the reeds 37 and 38.

Also disposed on the top of the housing member 6 is a conventional ammeter 53 adapted to be connected with the wire 71 extending from the contact points 47 and 48 and also with the battery 72.

Disposed within the casing is the customary primary coil 58 and secondary coil 59 having a third winding 60 thereon.

The combination housing and magnet 17 is provided with a nonconducting top 61 secured thereon by means of screws 62 or any other suitable means. An aperature 63 is provided through the top 61 and a counter sunk portion 64 disposed therearound into which a glass 65 may be placed and secured by means of a name plate 66 secured to the top 61 by means of screws 67. The name plate 66 has an aperture 68 therein corresponding with the aperture 63 in the top 61. In this manner, it will be possible to view from the outside the contact points on the reeds 34, 37 and 38 to determine whether or not they are sparking.

The electrical operation of my improved device is more or less conventional and consists of applying alternating current voltage through the conductors 69 and 70 to a primary coil 58. Voltage is induced from the primary coil 58 to the third winding 60 so as to create an induced current flowing through the conductor 76, coil 25 and conductor 77 back into the winding 60. This current passing coil 25 will, in conjunction with the magnet 17, cause the vibration of the reed 34, so as to alternately make and break contact of the points 47 and 48 with the points 49 and 50 on the reeds 37 and 38. The charging current flows from the secondary coil 59 through either the conductor 74 or 75 and the contact points 49 or 50 into the ammeter 53, through the conductor 71, and thence into the battery 72, and through the conductor 73 back into the secondary 59. It is, of course, necessary that the reed 34 shall vibrate in a manner whereby substantially no sparking shall occur on the breaking of the contact of the points 47 and 48, with the points 49 and 50. The method of accomplishing this result is well known in the art, does not constitute a portion of my invention and is not therefore described in detail.

It is obvious that various changes may be made in the arrangement, combination and construction of the various parts of my improved device without departing from the spirit of my invention and it is my intention to cover by my claims such changes as may be reasonably included within the scope thereof.

What I claim is:

1. A device of the class described, comprising a rectifier having a vibratory reed, means, including a magnet, for causing said reed to vibrate, and a housing for said reed comprising said magnet on the sides thereof and cover members secured to the bottom and to the top of said magnet.

2. A device of the class described, comprising a rectifier having a vibratory reed, means, including a magnet, for causing said reed to vibrate, and a housing for said reed comprising said magnet on the sides thereof and cover members secured to the bottom and to the top of said magnet, said top cover member having an aperture therein and a countersunk portion around said aperture, glass disposed in said countersunk portion, and a second cover disposed over said countersunk portion and having an aperture therein registering with said first aperture.

3. A device of the class described, comprising a rectified having a vibratory reed, a magnet and a coil member suspended by angle plates secured to the sides of said magnet, said reed being extended through said coil and having one end loosely disposed between the free ends of said magnet and having contact points intermediate its ends within said magnet and a strap secured to said free ends of said magnet so that all the reeds and contact points thereon will be enclosed.

4. A device of the class described, comprising a rectifier having a vibratory reed, a magnet and a coil member suspended on the inside of the magnet walls by angle plates secured to the sides of said magnet, said reed being extended through said coil and having one end disposed between the free ends of said magnet, a strap secured to the free ends of the magnet and a pair of reeds disposed one on either side of said first reed and having contact points thereon adapted to alternately contact with contact points disposed on either side of said first reed intermediate its ends, all of said contact points being located within said magnet walls and all of said reeds being enclosed by said magnet and said strap.

RAY W. NILES.